United States Patent [19]
Slysh

[11] 4,012,549
[45] Mar. 15, 1977

[54] HIGH STRENGTH COMPOSITE STRUCTURE

[75] Inventor: Paul Slysh, San Diego, Calif.

[73] Assignee: General Dynamics Corporation, San Diego, Calif.

[22] Filed: Oct. 10, 1974

[21] Appl. No.: 513,661

[52] U.S. Cl. .............................. 428/116; 52/630; 244/119; 428/119; 428/167; 428/178; 428/179; 428/902

[51] Int. Cl.² ..................................... B32B 3/12

[58] Field of Search ............... 52/81, 82, 630, 729, 52/730, 732; 244/119, 129 R, 131, 133; 428/63, 163, 167, 268, 417, 418, 902, 911, 116, 119, 178, 179

[56] References Cited

UNITED STATES PATENTS

| 3,042,050 | 7/1962 | Finlayson | 428/12 X |
| 3,099,335 | 7/1963 | Sklar | 52/729 X |
| 3,323,820 | 6/1967 | Braccini | 52/81 X |
| 3,349,537 | 10/1967 | Hopfeld | 52/729 |
| 3,743,455 | 7/1973 | Green | 425/78 |
| 3,778,334 | 12/1973 | Sturgeon | 428/902 X |
| 3,840,350 | 10/1974 | Tucker, Jr. | 428/902 X |
| 3,857,150 | 12/1974 | Faucheux | 52/81 X |

FOREIGN PATENTS OR APPLICATIONS

| 47,113 | 3/1933 | Denmark | |
| 577,154 | 5/1946 | United Kingdom | 244/119 |

OTHER PUBLICATIONS

The Isogrid an Article by Paul Slysh on pp. 102 to 107 of Machine Design, Apr. 19, 1973, vol. 45, No. 9.

Primary Examiner—George F. Lesmes
Assistant Examiner—Henry F. Epstein
Attorney, Agent, or Firm—John R. Duncan

[57] ABSTRACT

An isogrid structure having inset strips of composite materials at the top and bottom of the grid webs. A preferably flanged isogrid basically consists of I-beam members arranged in an integral repeating pattern of substantially equilateral triangles. One flange may be integral with a skin sheet covering the structure. At least some of these flanges are provided with grooves running parallel to the beam webs, filled with advanced composite materials comprising high-strength fibers in a supporting matrix. Preferably, the fibers run parallel to the beam webs. Preferred arrangements of the fibers are described.

10 Claims, 3 Drawing Figures

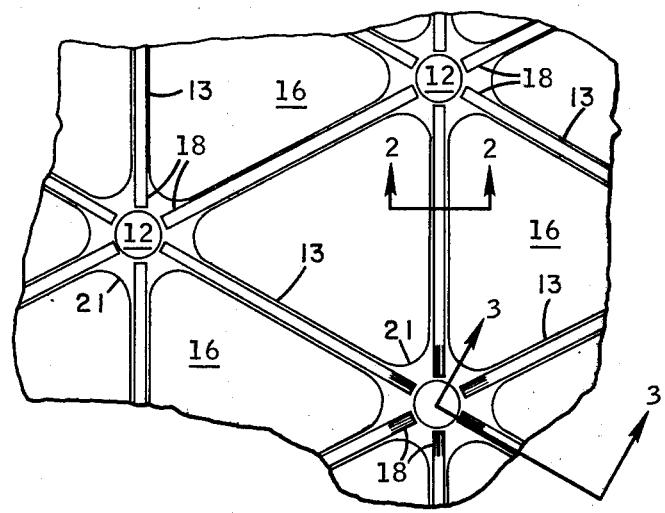
FIG. 1
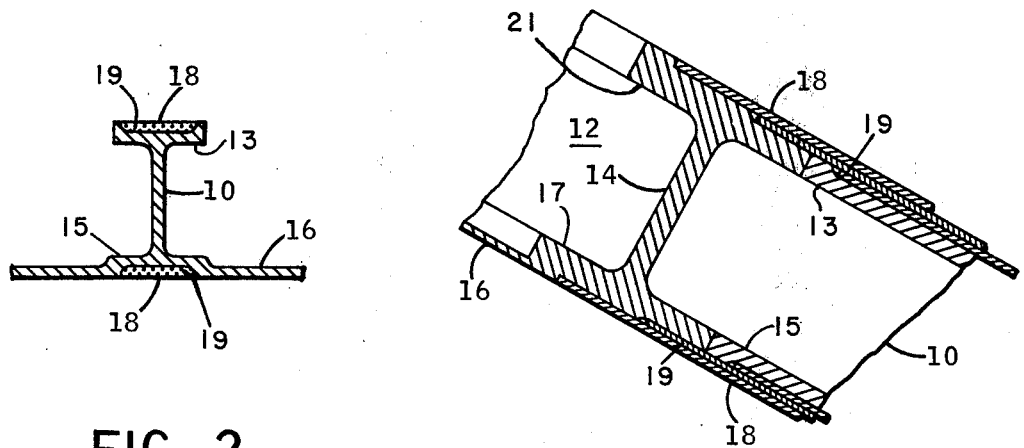
FIG. 2
FIG. 3

HIGH STRENGTH COMPOSITE STRUCTURE

BACKGROUND OF THE INVENTION

Recently, a number of very high strength-to-weight structures have been developed for special applications, such as aircraft and aerospace uses. Some of these structures, fabricated from metals such aluminum and titanium rely on very efficient configurations to obtain the desired strength, rigidity, etc. One of these configurations is the "isogrid" in which upstanding ribs generally integral with a sheet material are arranged as a series of substantially equilateral triangles. The performance of such a structure can be further improved by the addition of a narrow flange along the upper edge of the ribs, parallel to the base sheet, and a second flange at the rib base in the form of a thickened sheet strip along the rib. This provides ribs which are in effect I-beams integral with the sheet, which may form a skin for the structure. These may be called "flanged isogrid" structures. Isogrid structures may be further classified as "closed" where the grid is integral with a skin sheet and "open" where the skin is omitted. Examples of such a structure are provided in my copending U.S. patent application, Ser. No. 495,029, filed Aug. 5, 1974, and assigned to the assignee of this application (now U.S. Pat. No. 3,940,891), and my article entitled "The Isogrid," Machine Design, Apr. 19, 1973, pages 102-107. While these structures are very effective, they are still limited by the strength and stiffness of the metal in reasonable thicknesses. Further, weight becomes a problem if attempts are made to increase strength through thicker materials.

Another approach to achieving high strength-to-weight ratio structures has been through the use of "advanced composite materials" which use very high-strength fibers, e.g., epoxy and polyimide resins or aluminum. These materials have exceptional stiffness and strength and have been fabricated into a variety of structural components such as tubes, I-beams, etc. Fabricating more complex structures has been very difficult, due to the complex tooling required and the very precise forming and curing procedures required. For example, normal forming of sheets of these composite materials is impossible, since the fibers cannot be bent appreciably without fracturing. Because of these problems, advanced composite materials have been little used except for aerospace applications where high strength with low weight justify the very high cost of the materials and their fabrication.

Thus, there is a continuing need for structures with high strength and low weight.

It is, therefore, an object of this invention to provide a structure overcoming the above-noted problems.

Another object of this invention is to provide a structure of improved stiffness with a high strength-to-weight ratio.

Another object of this invention is to provide a structure combining the desirable features of isogrid structures and advanced composite materials.

SUMMARY OF THE INVENTION

The above objects, and others, are accomplished in accordance with this invention by a flanged isogrid structure having strips of advanced composite materials embedded in the outer surfaces of the "I-beam" flanges of the isogrid array.

Generally, an isogrid structure with shallow grooves in the "I-beam" like flanges is formed, preferably by numerically controlled milling from a metal plate, the structure is shaped, such as by rolling or brake forming, to its final configuration, shallow wide grooves are formed in the "I-beam" like flanges, then long strips of composite materials comprising parallel high-strength fibers are bonded to the metal, filling the grooves.

BRIEF DESCRIPTION OF THE DRAWING

Details of the invention, and a preferred embodiment of the invention, are illustrated in the drawing, wherein:

FIG. 1 is a plan view of the composite reinforced isogrid structure of this invention;

FIG. 2 is a section through the structure, taken on line 2—2 in FIG. 1; and

FIG. 3 is a section through the structure taken on line 3—3 in FIG. 1.

DETAILED DESCRIPTION OF THE INVENTION

The drawing illustrates, somewhat schematically, portions of a flanged isogrid structure reinforced with strips of advanced composite materials. As seen in FIG. 1, the isogrid pattern is made up of a plurality of first flanged ribs 10 which meet at nodes or pockets 12. As best seen in FIG. 3, nodes 12 are surrounded by circular flanged second ribs 14, generally similar to ribs 10 as seen in FIG. 2. Each rib 10 and 14 has the general form of an I-beam, with the lower flange 15 on rib 10 and lower flange 17 on rib 14 integral with skin 16. Upper flanges 13 on first ribs 10 transition into upper flanges 21 on second ribs 14 at each node 12. Similarly, lower flanges 15 on first ribs 10 transition into lower flanges 17 on second ribs 14 at each node. As seen in FIG. 1, these transition zones are in the form of smooth fillets.

Strips 18 of high strength fiber reinforced composite materials are embedded in grooves 19 formed in the outer surfaces of the upper flange 13 and lower flange 15 of ribs 10 and upper flange 21 and lower flange 17 of ribs 14. Strips 18 comprise substantially parallel high-strength fibers embedded in a supporting matrix. The orientation of the fibers in each strip is schematically illustrated at the strip ends at the lower right-hand node 12 in FIG. 1.

At the intersection of a rib 10 and the circular rib 14 at a node 12, the composite strip 18 is tapered to minimize peaking of transitional stress, as illustrated in FIG. 3. Where, as shown in FIG. 3, strip 18 is made up of three layers of parallel contiguous fibers, the strip is step tapered by ending each layer at a different distance from node 12. If the strip were homogenous, or a single layer, then individual fibers could be cut off randomly at different points to produce a tapered effect.

The composite reinforcing strips may be used with any suitable flanged isogrid structure. The triangles formed by ribs 10 may have any suitable size. Preferably, triangle size is selected to divide integrally into the selected panel size. The isogrid panels may typically be flat, cylindrical, conical, or other appropriate shapes.

The isogrid panel may be manufactured in any suitable manner. In most cases, machining with numerically controlled milling machines will be preferred for simplicity, accuracy, and optimum physical characteristics. If desired, the panels may be cast, diffusion molded, etc. Ordinarily, the isogrid panel will be machined, the grooves for strips 18 will be machined, the panel will be shaped as described, such as by brake, roll or stretch forming, then the strips 18 will be bonded into the grooves. However, where the reinforcing fibers are embedded in a metal matrix, such as boron fibers in an aluminum matrix, the strip receiving grooves may be initially formed in the metal plate, followed by diffusion bonding the strips into the grooves, then heat treating the plate and machining the isogrid structure.

The basic isogrid structure may be formed from any suitable material. Typical materials include aluminum, titanium, magnesium, steel, and mixtures and alloys thereof.

Strips 18 may be formed from any suitable high-strength fibers in a suitable supporting matrix. Preferably, all of the fibers are substantially parallel to each other and to the web 10 to which the strip is bonded. Conveniently, single layers of contiguous parallel fibers may be prepared, bonded by the at least partially cured matrix material. Such "prepreg" sheets may be cut to the desired width and stacked to produce strips 18. The tapered ends shown in FIG. 3 may easily be produced by this method. Alternately, a tow of fibers wet with matrix material may be placed in a strip-shaped mold and formed to the desired shape, then adhesivly or otherwise bonded to the flange groove. After molding, the strip may be tapered by trimming diagonally to narrow the strip near each end.

Typical high-strength fibers include boron and graphite fibers. In some cases, high-strength glass fibers or some very high-strength synthetic fibers, may have suitable properties. Preferably, the fibers have a Young's modulus of at least about $20 \times 10^6$ psi and tensile strength of at least 300,000 psi.

Typical matrix materials include epoxy and polyimide resins and aluminum. The strips may be bonded to the flanges of webs 10 by any suitable means. Metal matrix strips may, for example, be diffusion bonded into the flange grooves. Where the strips include a partially cured synthetic resin, the strips may be emplaced and bonded by completing the resin cure. Also, various synthetic resin bonding agents and glues may be used to secure fully cured resin matrix or metal matrix strips in place.

Strips 18 may have any suitable shape and configuration. Generally, it is preferred that the strips be wide and thin, covering nearly the entire surface of the flanges of webs 10 or the web edges if unflanged. For best results, the width-to-thickness ratio of said strips should be at least about 7 to 1. While strips 18 could be bonded to these flanges directly and not in grooves, the grooves are preferred, since they act as positioning fixtures for the strips, as well as providing extra shear load transfer area between the isogrid structure and the composite strips. Composite strips may be used in either longitudinal or transverse flanges, or both, as desired. Strips of greater cross-section areas may be desirable on transverse webs, with cross-section strips on the webs in line with the load. In a homogenous isogrid, the diagonal members generally react less load than the in-line members. Increasing the stiffness of the diagonal members causes them to carry more of their share of the load. Since there are twice as many diagonal as in-line members for a given load direction, significant structural efficiency improvement is possible by careful selection of strip cross-section area of different webs.

DESCRIPTION OF PREFERRED EMBODIMENTS

The following Examples detail several preferred embodiments of the method of fabricating improved isogrid structures according to this invention. Parts and percentages are by weight unless otherwise indicated.

EXAMPLE I

A 1-inch thick aluminum plate (2024-T351 alloy) is faced on both surfaces to a uniform thickness of 0.73 inch, then a flanged isogrid pattern is formed by a numerically controlled milling machine, flat on a vacuum chuck. The triangular recesses and nodes are first machined with end mills to the edge of the web flanges, then the undercuts under the flanges are machined with conventional T-slot cutters. In this case, three panels are machined with conventional T-slot cutters. In this case, three panels are machined to the same pattern. The entire panel is about 37.25 inches high, 125.6 inches wide, and 0.73 inch thick. The isogrid pattern is made up of equilateral triangles with a spacing between node centers of about 7.34 inches. The node webs have a radius of about 0.69 inch. The skin has a thickness of about 0.40 inch. The webs have a thickness of about 0.07 inch near the skin and 0.04 inch near the upper flanges, which are about 0.42 inch wide and 0.82 inch thick. The flanges integral with the skin are about 0.42 inch wide and 0.05 inch thick. The isogrid pattern merges into a 2.11 inch wide pattern of small rectangular pockets, (of the sort shown in my copending patent application Ser. No. 495,029, filed Aug. 5, 1974), surrounded by flanged webs, along the long edges of the panel, to provide attachment means for the panel. The isogrid pattern is oriented with one leg of each triangle perpendicular to the long edge of the panel and the other two legs at about 30° to that edge. Grooves about 0.37 inch wide and about 0.027 inch deep are milled in each flange up to about 1.0 inch from the nodes. The pockets in each panel are filled with a low temperature thermoplastic epoxy filler material, available under the trademark "Rigidax" from the M. Argueso Co. Each panel is then roll formed along the longer dimension in a set of pinch rollers to a radius of about 60.22 inches. Accuracy is about 0.10 inch. The panels are heated above the 175° F. melting temperature of the filler to remove the filler. The ribs and flanges are marked and the skin is chemically melted to a thickness of about 0.30 inch. The panels are clamped to a form and aged at about 375° F for about 18 hours. Sheets of a "prepreg" material are cut to length and placed in the grooves formed in two of the panels. The sheets consist of 0.0056 inch diameter "Borsic" boron fibers from United Aircraft in a single contiguous parallel layer in a partially cured Shell Epon 1007 epoxy resin matrix. In one panel, three layers of the composite material are placed in each groove, with two layers stepped back 0.24 and 0.47 inch, respectively, from the end of the groove. In a second panel, two layers are placed in the flanges lying perpendicular to the panel edge and four are placed in the transverse flanges. These layers are similarly stepped back in increments of 0.24 inch. Removable urethane plugs are placed in all pockets, the two panels are vacuum bagged and placed in an autoclave, where they are maintained at 900° F for 2 hours under 600 psi pressure to cure the resin. Each of the three panels is then tested in a large loading fixture. A large number of strain gages (120 ohm resistance type FAE-25-12513 from BLH Electronic, Inc.) are applied to the structure to measure strain at different locations. It is found that the composite reinforced panels react significantly greater load than the all aluminum panel, and that the panel using more reinforcement in the transverse than in the in-line flanges distributes stress throughout the structure in an improved manner, and therefore reacts the greatest load.

EXAMPLE II

A pair of aluminum isogrid panels are prepared as described in Example I, one with and one without flange grooves, except that in this case the flange grooves are 0.37 inch wide at the center, tapering near each end to a width of about 0.17 inch. A tow of high-strength graphite fibers, available from Union Carbide Corp. under the tradename "Thornel", are dipped in a solution of a polyimide resin, available from E. I. dupont de Nemours & Co. under the "Pyre ML-RK-692" trademark, in dimethyl formamide. The tow is placed in a mold having the dimension of the center of the flange grooves, but much longer. The resin is cured to a partially cured, tacky, but shape-retaining state. The strips are removed from the mold, trimmed to fit the flange grooves and inserted therein. Removable urethane plugs are placed in the isogrid pockets, the panel is vacuum bagged, placed in an autoclave and maintained at 400° F for 5 hours to complete the resin cure. The two panels are then tested in the manner described in Example I. The composite reinforced isogrid is superior in strength and load distribution when compared to the all aluminum isogrid.

EXAMPLE III

A pair of test structures are prepared from 25 by 40 inch, 0.75 inch thick 2124-T851 aluminum alloy. One panel is immediately milled with a numerically controlled milling machine to produce a flanged isogrid having 7.338 inch node-to-node spacing with one leg of the isogrid triangle perpendicular to the short edge of the plate. Solid metal is left between the panel edges and the beginning of the isogrid pattern. Skin thickness is about 0.03 inch, the upper flanges are about 0.065 inch thick and about 0.415 inch wide, and the lower, skin-integral, flanges are about 0.045 inch thick and 0.415 inch wide. The webs vary in thickness from about 0.05 inch near the base to about 0.04 inch near the upper flange. Where node flanges meet grid web flanges, about a 0.05 to 0.07 inch radius is provided. The second aluminum plate is grooved at the location of the transverse flanges in the first plate. The grooves are about 0.35 inches wide and 0.025 inch deep, extending to within about 0.9 inch of the node opening location. Four strips comprising single layers of contiguous, parallel, boron fibers in an aluminum matrix, available from Hamilton Standard under the "Borsic" trademark, are placed in the grooves. The three inner layers are stepped back from the groove 0.22, 0.44 and 0.68 inches. The panel is then covered with a vacuum diffusion mold assembly of the sort described in U.S. Pat. No. 3,743,455 and the assembly is placed in an autoclave and maintained at about 900° F for about 3 hours under 800 psi pressure. The second panel is then removed from the autoclave, the mold structure is removed and the plate is machined as described above with respect to the first panel. Each panel is placed in an edge loading fixture and subjected to axial compression producing distortions and skin failure. The panel incorporating the composite material is found to fail at a much higher loading than the homogenous panel.

While specific materials, preparations and arrangements have been detailed in the above descriptions of preferred embodiments, these may be varied and other equivalents used, where suitable as described above, with similar results. Other variations, applications and ramifications of this invention will occur to those skilled in the art upon reading this disclosure. These are intended to be contained within the scope of this invention, as defined in the appended claims.

I claim:
1. A composite structure comprising:
a skin sheet;
a uniform repeating triangular pattern of first upstanding ribs integral with said skin, across at least a portion of said skin;
a circular node at each corner of each triangle surrounded by a circular second rib;
each of said first and second ribs having a narrow first flange along the upper edge, lying substantially parallel to said skin and a narrow second flange formed by a thickened portion of said skin adjacent to said first and second ribs, whereby said first and second ribs have a substantially I-beam cross-section;
a groove in the outer surface of each flange on said first ribs filled with a composite material strip comprising high-strength fibers embedded in a supporting matrix;
said fibers being oriented substantially parallel to each other and to the supporting first rib, at least some of said fibers extending inwardly of said second rib at each node; and
said fiber strips being tapered at each end to a lesser cross-sectioned fiber density.

2. The structure according to claim 1 where said strip has a cross-section width-to-thickness ratio of at least 7 to 1.

3. The structure according to claim 1 wherein said strip comprises a plurality of fiber layers, each layer comprising a single layer of parallel contiguous fibers, said layers ending at different distances from said node to provide said taper.

4. The structure according to claim 1 wherein said fibers have a Young's modulus of at least about $20 \times 10^6$ psi and tensile strength of at least about 300,000 psi.

5. The structure according to claim 4 wherein said fibers are selected from the group consisting of boron fibers, graphite fibers and mixtures thereof.

6. The structure according to claim 1 wherein said matrix material is selected from the group consisting of epoxy resins, polyester resins, aluminum and mixtures and combinations thereof.

7. In an isogrid structure comprising:
a uniform repeating triangular pattern of first upstanding ribs, each rib having an upper and a lower edge;
a circular node at each corner of each triangle; each node being surrounded by a circular second rib;
narrow parallel upper and lower flanges along the upper and lower edges of each of said first and second ribs, respectively;
a skin sheet integral with said lower flanges;
the improvement comprising:
wide, shallow grooves in the upper surface of each upper flange on each first rib, said grooves filled with a composite material strip comprising fibers having a composition selected from the group consisting of boron, graphite and mixtures thereof, embedded in a supporting matrix;

said fibers lying substantially parallel to each other and to said first ribs;

at least some of said fibers extending inwardly at said nodes beyond said second ribs;

said fiber strip tapering at each end to a lesser cross-sectioned fiber density.

8. The structure according to claim 7 wherein said matrix material is selected from the group consisting of epoxy resins, polyester resins, aluminum and mixtures and combinations thereof.

9. The structure according to claim 7, wherein said strip has a cross-section width-to-thickness ratio of at least 7 to 1.

10. The structure according to claim 7 wherein said strip comprises a plurality of fiber layers, each layer comprising a single layer of parallel contiguous fibers, said layers ending at different distances from the center of said node to provide said taper.

* * * * *